(12) United States Patent
Hejda

(10) Patent No.: US 8,172,174 B2
(45) Date of Patent: May 8, 2012

(54) HYBRID ELECTROMECHANICAL/HYDROMECHANICAL ACTUATOR AND ACTUATION CONTROL SYSTEM

(75) Inventor: Zdenek Hejda, Prague 4 Chodov (CZ)

(73) Assignee: Honeywell International Inc., Morristown, NJ (US)

( * ) Notice: Subject to any disclaimer, the term of this patent is extended or adjusted under 35 U.S.C. 154(b) by 780 days.

(21) Appl. No.: 12/270,523

(22) Filed: Nov. 13, 2008

(65) Prior Publication Data

US 2010/0116929 A1    May 13, 2010

(51) Int. Cl.
*B64C 3/38* (2006.01)

(52) U.S. Cl. ........... 244/99.2; 244/99.3; 244/99.4

(58) Field of Classification Search ......... 244/99.2, 244/99.3, 99.4, 99.5, 99.9
See application file for complete search history.

(56) References Cited

U.S. PATENT DOCUMENTS

| | | | |
|---|---|---|---|
| 3,198,082 A | 8/1965 | Kerris | |
| 3,269,676 A | 8/1966 | Hopkins | |
| 3,438,306 A | 4/1969 | Kazmarek | |
| 3,679,156 A | 7/1972 | Redmond, Jr. | |
| 3,898,916 A | 8/1975 | Renner et al. | |
| 4,120,469 A | 10/1978 | Westermeier | |
| 4,370,706 A | 1/1983 | Doniger et al. | |
| 4,447,769 A | 5/1984 | Corney | |
| 4,472,780 A | 9/1984 | Chenoweth et al. | |
| 4,762,294 A | 8/1988 | Carl | |
| 4,793,576 A | 12/1988 | Frerk | |
| 4,800,798 A | 1/1989 | Boldrin et al. | |
| 5,074,495 A | 12/1991 | Raymond | |
| 5,670,856 A | 9/1997 | Le et al. | |
| 5,806,806 A | 9/1998 | Boehringer et al. | |
| 6,206,329 B1 | 3/2001 | Gautier et al. | |
| 6,241,182 B1 * | 6/2001 | Durandeau et al. | 244/99.4 |
| 6,659,399 B1 * | 12/2003 | Bagnoli et al. | 244/99.4 |
| 6,755,375 B2 * | 6/2004 | Trikha | 244/99.4 |
| 7,007,897 B2 | 3/2006 | Wingett et al. | |
| 7,600,715 B2 * | 10/2009 | Matsui | 244/99.6 |
| 7,883,059 B2 * | 2/2011 | Kunz | 244/178 |
| 2004/0075020 A1 * | 4/2004 | Trikha | 244/75 R |
| 2006/0255207 A1 * | 11/2006 | Wingett et al. | 244/99.4 |
| 2007/0018040 A1 * | 1/2007 | Wingett et al. | 244/99.4 |

* cited by examiner

*Primary Examiner* — Kaitlin Joerger (74) *Attorney, Agent, or Firm* — Ingrassia Fisher & Lorenz, P.C.

(57) ABSTRACT

A hybrid actuator assembly includes an actuator housing, an electromechanical actuator, and a hydraulic actuator. The electromechanical actuator is disposed at least partially within the actuator housing and is adapted to be controllably energized. The electromechanical actuator is configured, upon being controllably energized, to supply a first drive force. The hydraulic actuator is disposed at least partially within the actuator housing and is adapted to receive pressurized hydraulic fluid. The hydraulic actuator is configured, upon receipt of pressurized hydraulic fluid, to supply a second drive force.

16 Claims, 5 Drawing Sheets

HYBRID ELECTROMECHANICAL/HYDROMECHANICAL ACTUATOR AND ACTUATION CONTROL SYSTEM

TECHNICAL FIELD

The present invention relates to actuators and actuator controls and, more particularly, to actuators and actuation control systems that are hybrids of electromechanical actuation and hydraulic actuation technologies.

BACKGROUND

Aircraft typically include a plurality of flight control surfaces that, when controllably positioned, guide the movement of the aircraft from one destination to another. The number and type of flight control surfaces included in an aircraft may vary depending, for example, on whether the aircraft is a fixed-wing or rotary-wing aircraft. For example, most fixed-wing aircraft typically include primary flight control surfaces, such as a pair of elevators, a rudder, and a pair of ailerons, to control aircraft movement in the pitch, yaw, and roll axes. Aircraft movement of rotary-wing aircraft in the pitch, yaw, and roll axes is typically controlled by via movement of the rotating aircraft rotors, and may additionally be controlled via movement of one or more flight control surfaces.

The positions of the aircraft flight control surfaces and/or rotors are typically controlled via a flight control system. The flight control system, in response to position commands that originate from either the flight crew or an aircraft autopilot, moves the aircraft flight control surfaces and/or rotors to the commanded positions. In most instances, this movement is effected via actuators that are coupled to the flight control surfaces. Typically, the position commands that originate from the flight crew are supplied via one or more inceptors. For example, many fixed-wing aircraft include a plurality of inceptors, such as yokes or side sticks and rudder pedals, one set each for the pilot and for the co-pilot, and many rotary-wing aircraft include one or more of a cyclic, a collective, and rudder pedals.

In many aircraft, including both fixed-wing aircraft and rotary-wing aircraft, the flight control system may be a hydro-mechanical system, which may include relatively complex hydraulic plumbing and various hydraulic actuators. Although hydraulic actuators are relatively robust, these actuators may not be suitable for all aircraft operating regimes. For example, during quasi-static operations of many fixed-wing aircraft, one or more of the primary flight control surfaces may be held at a generally fixed position, while compensating for the primary flight control surface hinge moments. Such operations can be unsuitable for hydraulic actuators.

More recently, all or portions of the above-mentioned hydro-mechanical flight control systems are being retrofitted or replaced with electromechanical systems. No matter the particular type of system that is implemented (e.g., hydro-mechanical or electromechanical), the flight control system may need to be designed to withstand postulated, though unlikely, component inoperability. For example, the flight control system may need to withstand the postulated occurrence of an actuator becoming inoperable. At the same time, these systems should be designed to prevent a very highly unlikely, yet postulated, common-mode failure that could result in loss of control. Designing flight control systems to meet such design standards can be relatively costly and complex when trying to implement an electromechanical type system.

Hence, there is a need for a fly-by-wire flight control system that can withstand postulated, though unlikely, component inoperability and highly unlikely, yet postulated, common-mode failures, and that can be implemented at a cost that is relatively less costly and/or relatively less complex than presently known systems. The present invention addresses at least this need.

BRIEF SUMMARY

In one embodiment, and by way of example only, an actuator assembly includes an actuation element, an electromechanical actuator, a hydraulic actuator, and a link. The actuation element is adapted to receive an actuation drive force. The electromechanical actuator is adapted to be controllably energized and is configured, upon being controllably energized, to supply a first drive force. The hydraulic actuator is connected to the electromechanical actuator and is adapted to receive pressurized hydraulic fluid. The hydraulic actuator is configured, upon receipt of pressurized hydraulic fluid, to supply a second drive force. The link has a first end and a second end. The link is rotationally connected to the electromechanical actuator at a position between the link first and second ends to receive the first drive force therefrom, the link first end is rotationally connected to the hydraulic actuator to receive the second drive force therefrom, and the link second end rotationally connected to the actuation element to supply the actuation drive force to the actuation element upon receipt, by the link, of the first drive force or the second drive force.

In another exemplary embodiment, an actuator assembly includes an actuator housing, an electromechanical actuator, and a hydraulic actuator. The electromechanical actuator is disposed at least partially within the actuator housing and is adapted to be controllably energized. The electromechanical actuator is configured, upon being controllably energized, to supply a first drive force. The hydraulic actuator is disposed at least partially within the actuator housing and is adapted to receive pressurized hydraulic fluid. The hydraulic actuator is configured, upon receipt of pressurized hydraulic fluid, to supply a second drive force.

In yet another exemplary embodiment, a flight control surface actuation system includes an actuation element, an electromechanical actuator, a hydraulic actuator, a link, and an actuator controller. The actuation element is adapted to couple to a flight control surface and to receive an actuation drive force. The actuation element is responsive to the actuation drive force to move the flight control surface to a commanded position. The electromechanical actuator is adapted to be controllably energized and is configured, upon being controllably energized, to supply a first drive force. The hydraulic actuator is connected to the electromechanical actuator and is adapted to receive pressurized hydraulic fluid. The hydraulic actuator is configured, upon receipt of pressurized hydraulic fluid, to supply a second drive force. The link has a first end and a second end. The link is rotationally connected to the electromechanical actuator at a position between the link first and second ends to receive the first drive force therefrom. The link first end is rotationally connected to the hydraulic actuator to receive the second drive force therefrom. The link second end is rotationally connected to the actuation element to supply the actuation drive force to the actuation element upon receipt, by the link, of the first drive force or the second drive force. The actuator controller is adapted to receive flight control surface position commands and is operable, in response thereto, to controllably energize the electromechanical actuator or controllably direct pressurized hydraulic fluid to the hydraulic actuator.

Other desirable features and characteristics of the present invention will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although the present invention is depicted and described in the context of a fixed-wing aircraft, the present invention is not limited to this type of aircraft, to aircraft in general, or to vehicular environments. Indeed, the invention could be implemented in various other aircraft including, but not limited to, various rotary-wing aircraft, multi-rotor rotary-wing aircraft, NOTAR (no tail rotor) rotary-wing aircraft, tip jet rotor rotary-wing aircraft, and contra-rotating rotary-wing aircraft. The invention could also be implemented in various other vehicular and non-vehicular environments.

Figure 1:
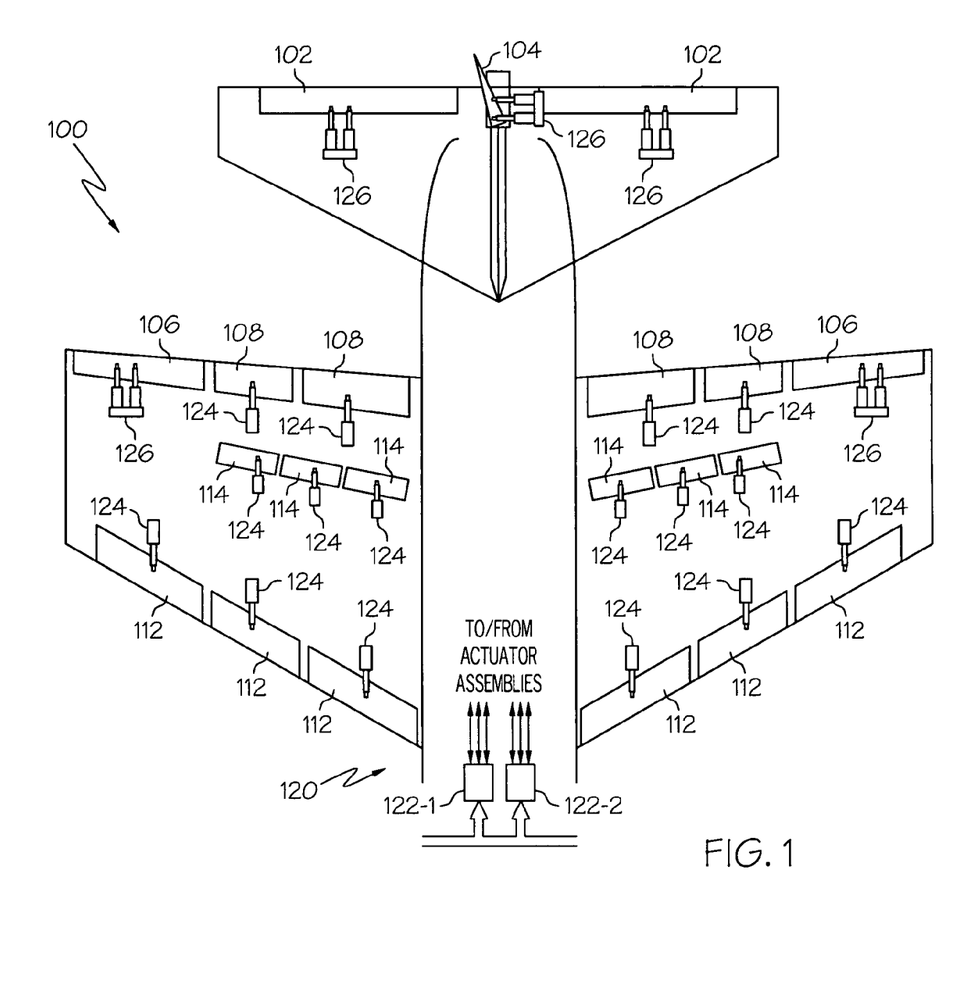
FIG. 1 depicts a functional schematic representation of an exemplary fixed-wing aircraft.

Referring now to FIG. 1, a schematic diagram of a portion of an exemplary aircraft and an exemplary flight control surface actuation system is shown. In the illustrated embodiment, the aircraft 100 includes a pair of elevators 102, a rudder 104, and a pair of ailerons 106, which are the primary flight control surfaces, and a plurality of flaps 108, slats 112, and spoilers 114, which are the secondary flight control surfaces. The primary flight control surfaces 102-106 control aircraft movements about the aircraft pitch, yaw, and roll axes. Specifically, elevators 102 are used to control aircraft movement about the pitch axis, the rudder 104 is used to control aircraft movement about the yaw axis, and the ailerons 106 control aircraft movement about the roll axis. It is noted, however, that aircraft movement about the yaw axis can also be achieved either by banking the aircraft or by varying the thrust levels from the engines on opposing sides of the aircraft 100.

The secondary control surfaces 108-114 influence the lift and drag of the aircraft 100. For example, during aircraft take-off and landing operations, when increased lift is desirable, the flaps 108 and slats 112 may be moved from retracted positions to extended positions. In the extended position, the flaps 108 increase both lift and drag, and enable the aircraft 100 to descend more steeply for a given airspeed, and also enable the aircraft 100 get airborne over a shorter distance. The slats 112, in the extended position, increase lift, and are typically used in conjunction with the flaps 108. The spoilers 114, on the other hand, reduce lift and when moved from retracted positions to extended positions, which is typically done during aircraft landing operations, may be used as air brakes to assist in slowing the aircraft 100.

The flight control surfaces 102-114 are moved between retracted and extended positions via a flight control surface actuation system 120. The flight control surface actuation system 120 includes one or more actuator controllers 122 and a plurality of primary and secondary flight control surface actuator assemblies 124 and 126. It will be appreciated that the number of actuator controllers 122 may vary. However, in the depicted embodiment, the flight control surface actuation system 120 includes two multi-channel actuator controllers 122 (122-1, 122-2).

The system 120 and actuator controllers 122-1, 122-2 may be implemented according to any one of numerous operational configurations. For example, the system 120 could be configured such that one of the controllers 122-1 (122-2) is an active controller, while the other controller 122-2 (122-1) is in an inactive (or standby) mode. Alternatively, the system 120 could be configured such that both controllers 122-1, 122-2 are active and controlling all, or selected ones, of the flight control surface actuator assemblies 124, 126. No matter the specific configuration, each controller 122-1, 122-2, when active, receives flight control surface position commands from one or more non-illustrated external systems, such as a flight control computer or pilot controls. In response to the flight control surface position commands, the active controllers 122-1, 122-2 supply actuator position commands that cause the flight control surface actuator assemblies 124, 126 to move the appropriate flight control surfaces 102-114 to the commanded flight control surface position. Depending upon the configuration of the particular flight control surface actuator assembly 124, 126, the actuator position commands may be supplied directly to the actuator assembly or to a non-illustrated actuator controller associated with the actuator assembly.

The controllers 122-1, 122-2 also receive monitor signals that are representative of flight control surface actuator assembly 124, 126 operability. The controllers 122-1, 122-2, based on these monitor signals, determine the operability of the flight control surface actuator assemblies 124, 126. If one or both controllers 122-1, 122-2 determines that a primary flight control surface actuator assembly 126 is partially inoperable, it automatically compensates, if necessary, the actuator position commands supplied to that actuator assembly 126 for the partial inoperability. It will be appreciated that the monitor signals that the controllers 122-1, 122-2 receive may be supplied directly from the flight control surface actuator assemblies 124, 126, or from other systems and components such as, for example, non-illustrated flight surface position sensors.

The flight control surface actuation system 120 may also be implemented using various numbers and types of flight control surface actuator assemblies 124, 126. In addition, the number and type of flight control surface actuator assemblies 124, 126 per control surface 102-114 may be varied. In the depicted embodiment, the system 120 is configured such that a single, non-redundant actuator assembly 124 is coupled to each of the secondary flight control surfaces 108-114, and a single, redundant actuator assembly 126, embodiments of which are described in more detail further below, is coupled to each of the primary flight control surfaces 102-106.

Before proceeding further, it is noted that the embodiment depicted in FIG. 1 and described above is merely exemplary, and that the flight control surface actuation system 120 could be implemented in any one of numerous alternative configurations. For example, the system 120 could be configured such that two or more non-redundant actuator assemblies 124 are coupled to each, or selected ones, of the secondary flight control surfaces 108-114. The system 120 could also be configured such that one or more redundant actuator assemblies 126 are coupled to one or more of the secondary flight control surfaces 108-114, in addition to, or instead of, the single non-redundant actuator assemblies 124. Moreover, the system 120 could be configured such that two or more redundant actuator assemblies 126 are coupled to each, or selected ones, of the primary flight control surfaces 102-106.

No matter the specific number and type of non-redundant actuator assemblies 124 that are used, a more detailed description of the structure and function of the non-redundant actuator assembly 124 is not needed to fully enable or describe the claimed invention. As such, no further description thereof is included herein. However, descriptions of various embodiments of the redundant flight control surface actuator assembly 126 are included, and will now be provided.

Figure 2:
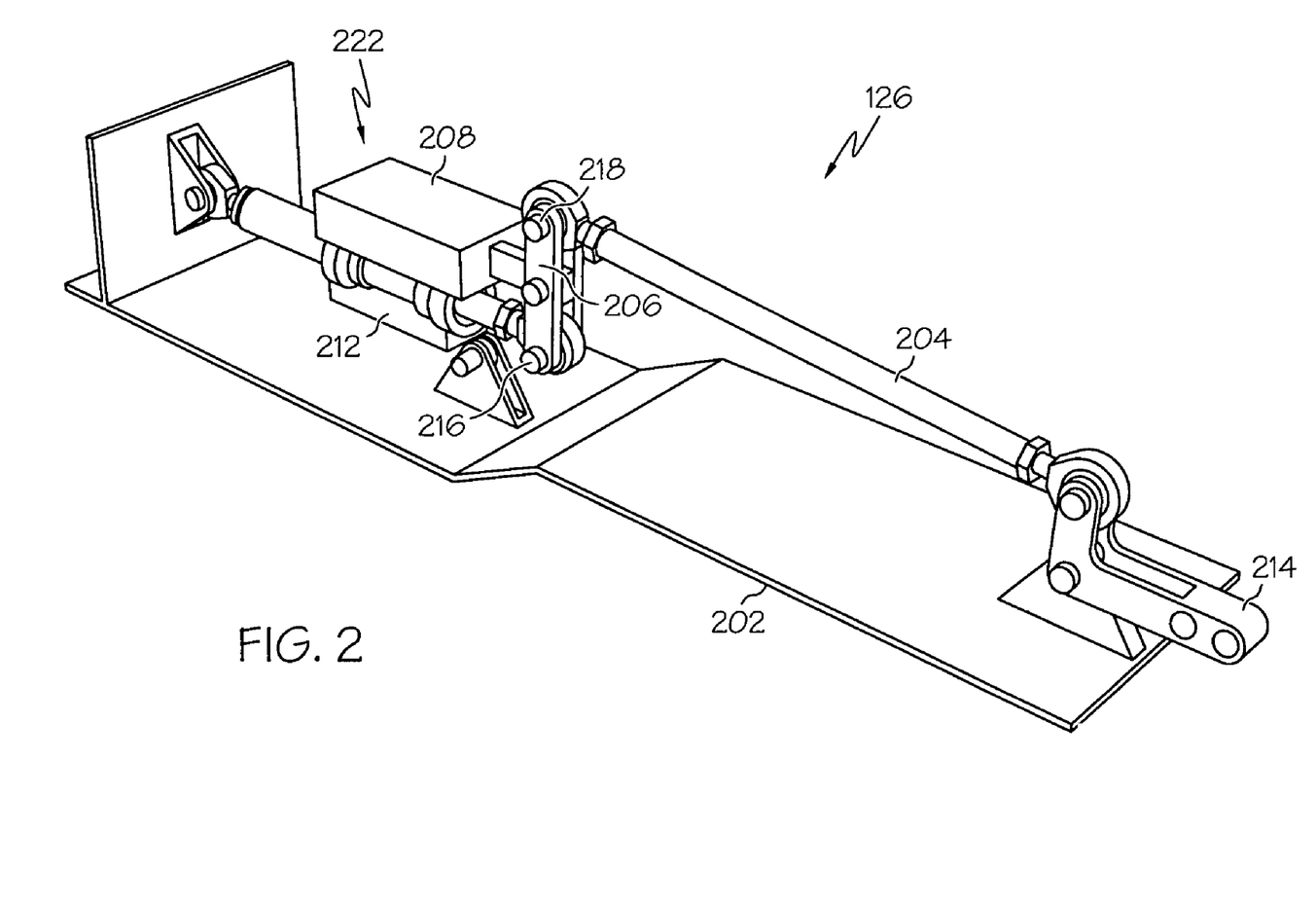
FIG. 2 depicts a plan view of an exemplary physical implementation of an embodiment of a redundant actuator assembly that may be used in the aircraft of FIG. 1.

Referring first to FIG. 2, a plan view of an exemplary physical implementation of an embodiment of a redundant actuator assembly 126 is depicted. The actuator assembly 126 may be variously disposed. In the depicted embodiment, the actuator assembly 126 is mounted within a wing 202 of a fixed-wing aircraft using suitable mounting hardware, and includes an actuation element 204, a link 206, an electromechanical actuator 208, and a hydraulic actuator 212. The actuation element 204 is coupled at one end to the link 206, and receives an actuation drive force, via the link 206, from either, or both, the electromechanical actuator 208 and the hydraulic actuator 212. The actuation element 202 is further coupled, at its opposing end, to a flight control surface via, for example, a suitable interconnection mechanism 214. The actuation element 204, upon receipt of the drive force supplied from either or both actuators 208, 212, via the link 206, moves the flight control surface, via the interconnection mechanism 214, to a commanded position.

The link 206 is coupled between the actuation element 204 and each of the actuators 208, 212. In the depicted embodiment it is seen that the link 206 includes a first end 216 and a second end 218. The link first end 216 is rotationally connected to the hydraulic actuator 212, and the link second end 218 is rotationally connected to the actuation element 204. As FIG. 2 further depicts, the link 206 is rotationally connected to the electromechanical actuator 208 at a position between the link first end 216 and the link second end 218. Although the precise position may vary, in the depicted embodiment this position is midway between the first and second ends 216, 218.

The electromechanical actuator 208 and the hydraulic actuator 212 are at least connected together. Most preferably, the actuators 208, 212 are disposed within a common actuator housing 222. The electromechanical actuator 208 is controllably energized from a non-illustrated power source. The electromechanical actuator 208 is configured, upon being controllably energized, to supply a drive force. This drive force is supplied, via the link 206, to the actuation element 204. The hydraulic actuator 212 is coupled to receive a flow of pressurized hydraulic fluid from a non-illustrated hydraulic fluid source. The hydraulic actuator 212 is configured, upon receipt of the pressurized hydraulic fluid, to supply a drive force. The drive force from the hydraulic actuator 212, as with the electromechanical actuator 208, is supplied to the actuation element 204 via the link 206. It will be appreciated that electromechanical actuator 208 and the hydraulic actuator 212 may each be variously implemented. A particular implementation of each actuator 208, 212, and a particular preferred manner in which each is controlled will now be described.

Figure 3:
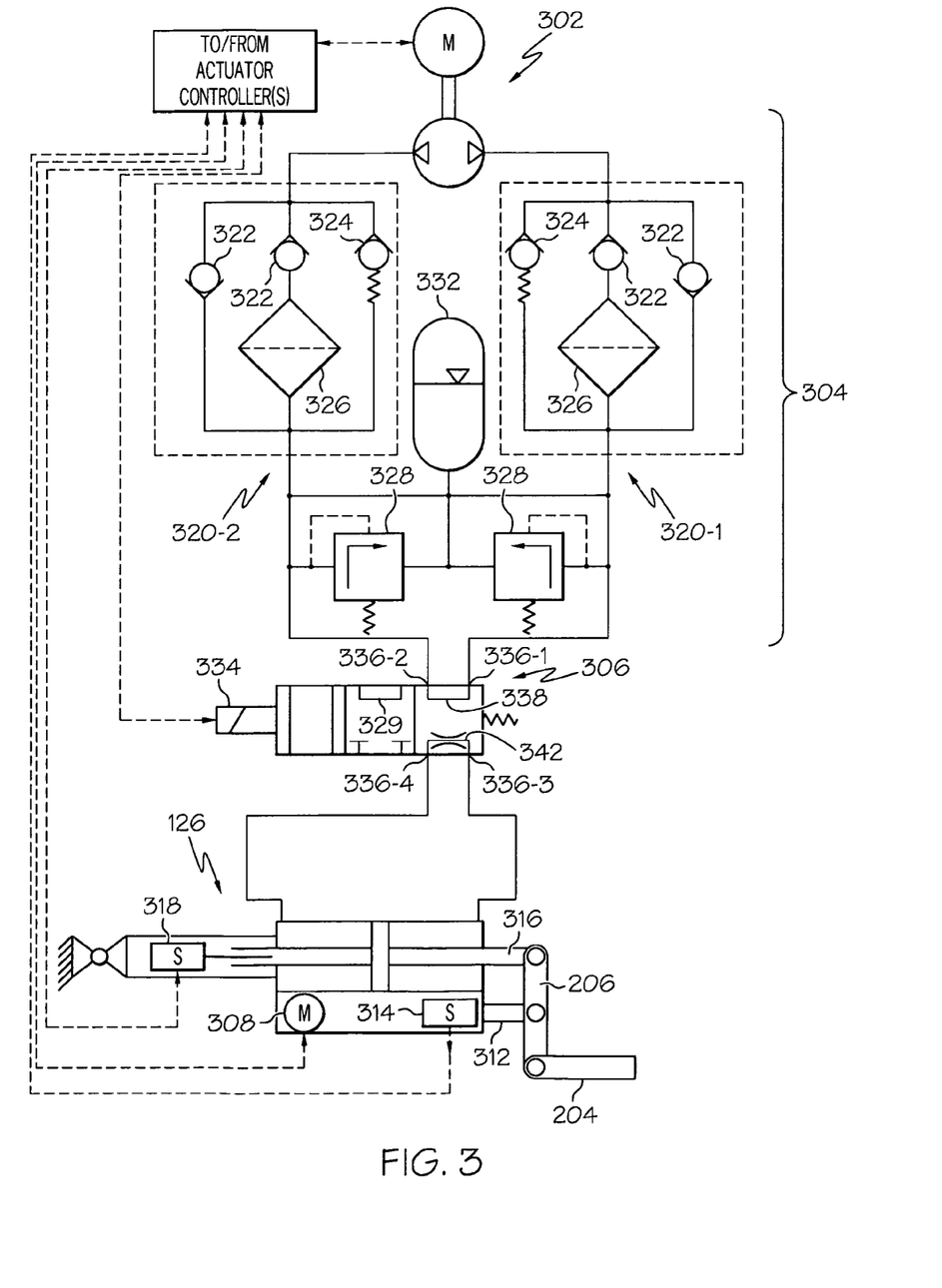
FIG. 3 depicts a functional schematic representation of at least a portion of a particular implementation of an actuation system that may include the actuator assembly of FIG. 2.

Turning now to FIG. 3, a functional schematic representation of an actuation control system 300 that may be implemented as part of the flight control surface actuation system 120 of FIG. 1, and using the actuator assembly 126 depicted in FIG. 2, will now be described. The control system 300 includes, in addition to the redundant actuator assembly 126, a hydraulic pump 302, a hydraulic distribution system 304, and a directional control valve 306. As FIG. 3 depicts, the electromechanical actuator 208 includes an electric motor 308, an actuation mechanism 312, and a position sensor 314. The electric motor 308 is coupled to be controllably energized, from a non-illustrated power, by an actuator controller (not depicted in FIG. 3), and is configured, upon being controllably energized, to supply a drive torque to the actuation mechanism 312. As was noted above when describing the overall flight control surface actuation system 100, the non-illustrated actuator controller may be one of (or may be formed part of one of) the actuator controllers 122 depicted in FIG. 1, or a separate actuator controller associated with the actuator assembly 126. It will be appreciated that the electric motor 308 may be implemented using brushed or brushless DC motors, various types of AC motors, a voice coil, a proportional solenoid, various types of linear motors, or various piezoelectric devices. In a preferred embodiment, however, the electric motor 308 is a brushless DC machine.

No matter the specific implementation of the motor 308 and the actuator controller, the actuation mechanism 312 is coupled to receive the drive torque from the motor 308. The actuation mechanism 312 is configured, upon receipt thereof, to translate and supply a drive force to the actuation element 204, via the link 206. It will be appreciated that the actuation mechanism 312 may be implemented using any one of numerous suitable linear actuators, such as ball screw, roller screw, and acme screw actuators. The actuation mechanism 312 may also be implemented using any one of numerous suitable rotary actuators that are configured to provide a linear output via, for example, a bell crank and mechanical link. It will additionally be appreciated that the electromechanical actuator 208 may additionally include a gearbox between the motor 308 and the actuation mechanism 312, if need or desired.

The position sensor 314, as may be appreciated, is configured to sense the position of the actuation mechanism 312, and supply a position signal representative thereof to the actuator controller. The position sensor 314 may be implemented using any one of numerous suitable position sensing devices including, for example, rotary variable differential transformers (RVDTs), linear variable differential transformers (LVDTs), potentiometers, various resistive sensors, and optical sensors, just to name a few. In the depicted embodiment, however, the position sensor 314 is implemented using an LVDT.

The hydraulic actuator 212 includes an actuation element 316 and a position sensor 318. The actuation element 316 is coupled to selectively receive pressurized hydraulic fluid and is configured, upon receipt thereof, to translate and supply a drive force to the actuation element 204, via the link 206. To implement this functionality, the actuation element 316 is preferably implemented as piston-type element, and the direction in which it translates is based on the direction in which pressurized hydraulic fluid is supplied to the hydraulic actuator 212.

The hydraulic actuator position sensor 318 is configured to sense the position of the hydraulic actuator actuation mechanism 316 and supply a position signal representative thereof to the actuator controller. As with the electromechanical actuator position sensor 314, the hydraulic actuator position sensor 318 may also be implemented using any one of numerous suitable position sensing devices including, for example, rotary variable differential transformers (RVDTs), linear variable differential transformers (LVDTs), potentiometers, various resistive sensors, and optical sensors, just to name a few. In the depicted embodiment, however, it is implemented using an LVDT.

As was just noted, the direction in which the hydraulic actuator actuation element 316 translates is based on the direction in which pressurized hydraulic fluid is supplied to the hydraulic actuator 212. The direction in which pressurized hydraulic fluid is supplied to the hydraulic actuator 212 is controlled by the hydraulic pump 302 and the directional control valve 306. The hydraulic pump 302 is coupled to be controllably energized, from a non-illustrated power source, by the actuator controller. The hydraulic pump 302 is configured, upon being controllably energized, to direct pressurized hydraulic fluid, through the hydraulic distribution system 304, to the directional control valve 306. Although the hydraulic pump 302 may be variously implemented, in the depicted embodiment it is implemented as an electric motor-driven, fixed-displacement, bidirectional hydraulic pump. As such, the hydraulic pump 302, depending upon the manner in which it is controllably energized, may supply pressurized hydraulic fluid in either of two directions. Thus, the hydraulic distribution system 304, which will now be described, includes two branches.

The hydraulic distribution system 304, as was just noted, includes two branches, a first branch 320-1 and a second branch 320-2. The two branches 308 are identically implemented and, at least in the depicted embodiment, each includes suitably disposed check valves 322, a filter 324, an anti-cavitation valve 326, and a pressure relief valve 328, all in fluid communication between the hydraulic pump 302 and the directional control valve 306. The hydraulic distribution system 304 additionally includes an accumulator 332 in fluid communication with both of the branches 320-1, 320-2. As may be appreciated, when the hydraulic pump 302 is energized in a manner to supply pressurized hydraulic fluid to the first branch 320-1, hydraulic fluid is returned to the pump via the second branch 320-2, and vice-versa. Whether the pressurized hydraulic fluid is supplied to the hydraulic actuator 212 depends on the position of the directional control valve 306.

The directional control valve 306, at least in the depicted embodiment, is implemented using a solenoid-operated, 4-port, 3-position control valve. The solenoid 334 is controllably energized by the non-illustrated actuator controller to control the position of the directional control valve 306. Two of the four ports 336-1, 336-2 are coupled to the hydraulic distribution system 304, with one being coupled to one branch 320-1 and the other being coupled to the other branch 320-2. The remaining two ports 336-3, 336-4 are coupled to the hydraulic actuator 212. When the directional control valve 306 is in a first position, which is the position depicted in FIG. 3, and the position when the solenoid 334 is de-energized, the first and second ports 336-1, 336-2 are in fluid communication with one another via a bypass line 338, and the third and fourth ports 336-3, 336-4 are in fluid communication with one another via a flow orifice 342. Thus, whatever position the hydraulic actuator 212 is in when the directional control valve 306 is placed in the first position, it will remain in this position.

When the solenoid 334 is energized in manner that it moves the directional control valve 306 to a second position, the first and second ports 336-1, 336-2 remain in fluid communication with one another via another bypass line 329. However, the third and fourth ports 336-3, 336-4 are no longer in fluid communication with one another via the flow orifice 342. Rather, these ports 336-3, 336-4 are dead-headed. Again, the hydraulic actuator 212 will remain in whatever position it was in when the directional control valve 306 is placed in the second position. It is noted that the directional control valve 306 is moved to the second position whenever the electromechanical actuator 208 is energized. It may thus be appreciated that dead-heading the third and fourth ports 336-3, 336-4 will prevent movement of the hydraulic actuator 212 during electromechanical actuator movement.

When the solenoid 334 is energized in manner that it moves the directional control valve 306 to a third position, the first and second ports 336-1, 336-2 are no longer in fluid communication with one another, and the third and fourth ports 336-3, 336-4 are no longer in fluid communication with one another. Rather, the first and third ports 336-1, 336-3 are in fluid communication with one another, and the second and fourth ports 33-2, 336-4 are in fluid communication with one another. It may be readily apparent that the directional control valve 306 is moved to the third position whenever it is desired to use the hydraulic actuator 212 to move the actuation element 204. It may also be readily apparent that the direction that the hydraulic actuator 212 moves, and more specifically the direction that the hydraulic actuator actuation element 316 moves, will depend upon the direction in which the hydraulic pump 302 is supplying the pressurized hydraulic fluid.

Having described an exemplary embodiment of the redundant actuator assembly 126, and an embodiment of an actuation control system 300, various operational modes implemented by the actuation control system 300 to control the redundant actuator assembly 126 will now be provided. In doing so, reference should first be made to FIGS. 4 and 5, which depicts a normal operational mode for the actuator assembly 126. In particular, during the normal operational mode the actuation control system 300 controls the actuator assembly 126 such that the hydraulic actuator 212 is the primary source of flight control surface movement, and the electromechanical actuator 208 is preferably used only to compensate for hinge moments.

Figure 4:
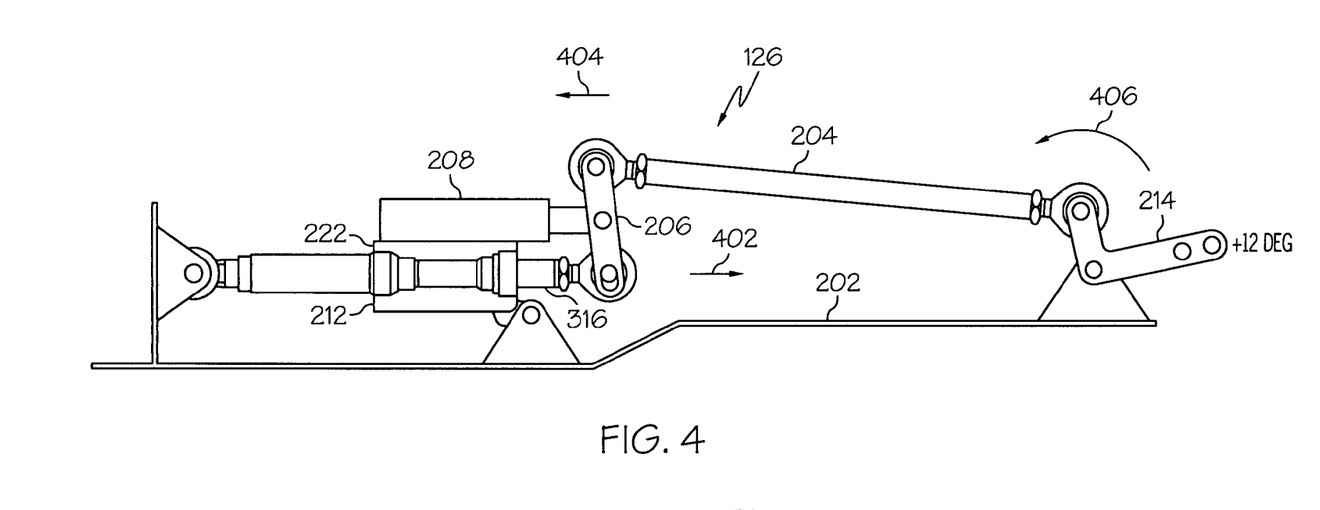
FIGS. 4 and 5 depict normal operational modes of the exemplary actuator assembly of FIG. 2.
Figure 5:
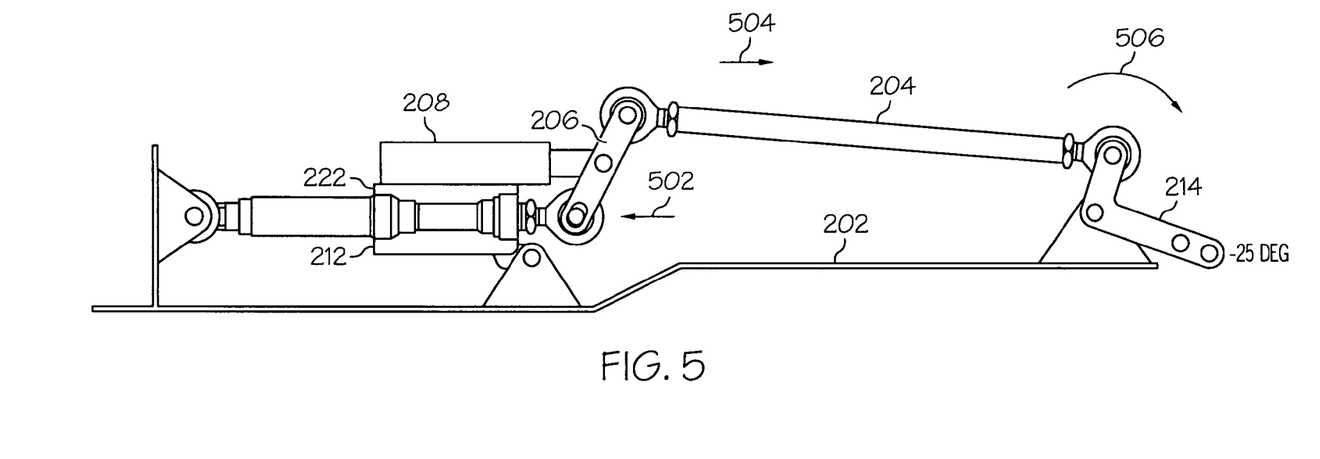

More specifically, and as shown in FIG. 4, moving the hydraulic actuator 212 an extended direction 402, while the electromechanical actuator 208 remains fixed, causes the actuation element 204 to translate in a first direction 404, which in turn rotates the interconnection mechanism (and hence an attached, non-illustrated flight control surface) in a counterclockwise direction 406. Conversely, and as shown in FIG. 5, moving the hydraulic actuator 212 a retracted direction 502, while the electromechanical actuator 208 remains fixed, causes the actuation element 204 to translate in a second direction 504, which in turn rotates the interconnection mechanism (and hence an attached, non-illustrated flight control surface in a clockwise direction 506. The electromechanical actuator 208 is used to compensate for hinge moments by moving the electromechanical actuator 208 in either the extended direction 402 or the retracted direction 502, while the hydraulic actuator 212 remains fixed. Moving the electromechanical actuator 208 in the extended direction, causes the actuation element 204 to translate in the second direction 504, which in turn rotates the interconnection mechanism (and hence an attached, non-illustrated flight control surface) in the clockwise direction 506. Conversely, moving the electromechanical actuator 208 in the retracted direction 502, causes the actuation element 204 to translate in the first direction 404, which in turn rotates the interconnection mechanism (and hence an attached, non-illustrated flight control surface) in the counterclockwise direction 406.

Figure 6:
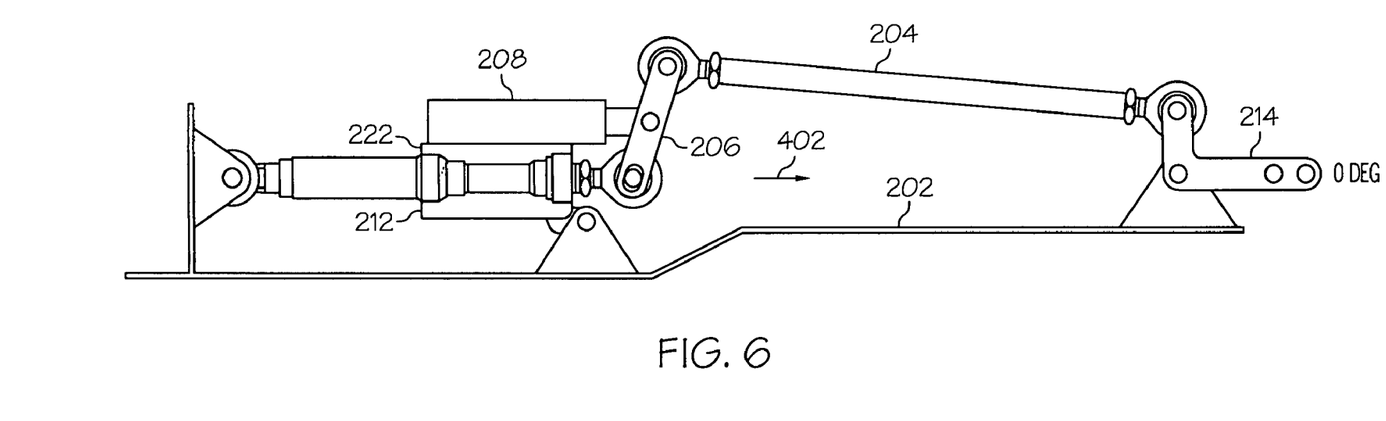
FIGS. 6 and 7 depict backup operational modes of the exemplary actuator assembly of FIG. 2.

In addition to compensating for flight control surface hinge moments, the electromechanical actuator 208 also serves as a back-up to the hydraulic actuator 212 in the unlikely event that the hydraulic actuator 212 becomes unavailable or otherwise inoperable. For example, and with reference now to FIGS. 4 and 6 in combination, assume the actuator assembly 126 is initially positioned as depicted in FIG. 4, thereby placing the non-illustrated flight control surface at a +12-degree position. Thereafter, assume the non-illustrated flight control surface is commanded to move to a 0-degree position, but that the associated actuator controller 122 determines that the hydraulic actuator 212 has become inoperable. When this occurs, the actuator controller 122 will compensate for this inoperability by energizing the electromechanical actuator 208 to move the flight control surface to the commanded position. As FIG. 6 depicts, this is accomplished by energizing the electromechanical actuator 208 to move in the extended direction 402.

Figure 7:
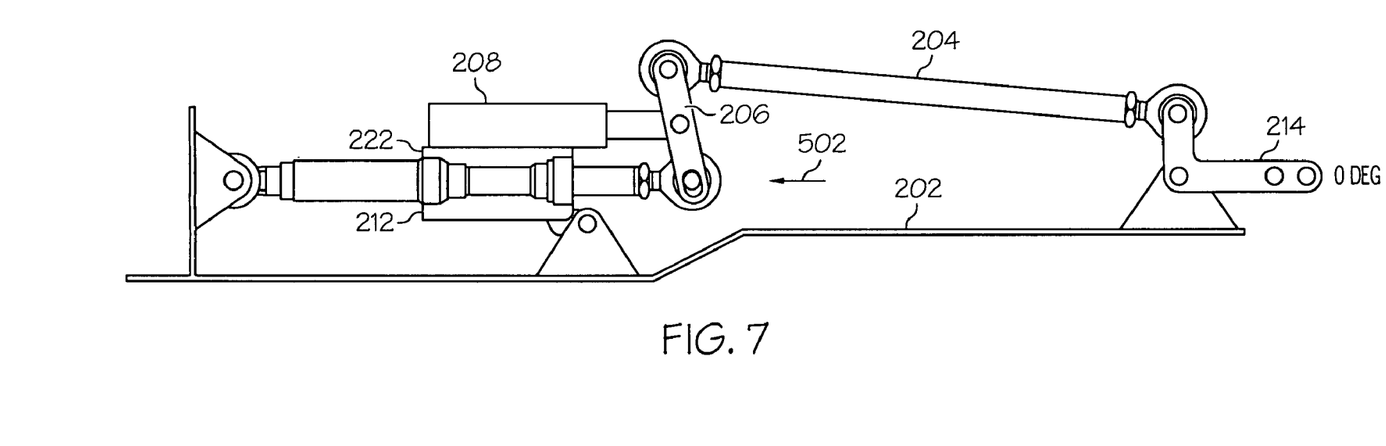

As another illustrative example of the backup operation of the electromechanical actuator 208, assume the actuator assembly 126 is initially positioned as depicted in FIG. 5, thereby placing the non-illustrated flight control surface at a −25-degree position. Thereafter, again assume the non-illustrated flight control surface is commanded to move to a 0-degree position, and that the associated actuator controller 122 determines that the hydraulic actuator 212 has become inoperable. When this occurs, the actuator controller 122 will compensate for this inoperability, as FIG. 7 depicts, by energizing the electromechanical actuator 208 to move in the retracted direction 502, and move the flight control surface to the commanded position.

In addition to the above, it will be appreciated that the hydraulic actuator 212 may also provide a backup for the electromechanical actuator 208, if needed or desired. Moreover, in the very highly unlikely event that both the electromechanical actuator 208 and hydraulic actuator 212 became simultaneously inoperable, the actuator assembly 126 may still be operated in a trail-damped mode in which the solenoid 334 is de-energized and both chambers of the hydraulic actuator 212 are connected via the flow orifice 342, so the actuation mechanism 316 cannot be jammed and the control surface will undergo convergent oscillation.

The aircraft flight control surface control system described herein can withstand postulated, though unlikely, component inoperability and highly unlikely, yet postulated, common-mode failures, at a cost that is relatively less costly and/or relatively less complex than presently known systems. The system can also precisely compensate for flight control surface hinge moments during quasi-static aircraft flight operations.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An actuator assembly, comprising:
   an actuation element adapted to receive an actuation drive force;
   an electromechanical actuator adapted to be controllably energized and configured, upon being controllably energized, to supply a first drive force;
   a hydraulic actuator connected to the electromechanical actuator and adapted to receive pressurized hydraulic fluid, the hydraulic actuator configured, upon receipt of pressurized hydraulic fluid, to supply a second drive force;
   a link having a first end and a second end, the link rotationally connected to the electromechanical actuator at a position between the link first and second ends to receive the first drive force therefrom, the link first end rotationally connected to the hydraulic actuator to receive the second drive force therefrom, the link second end rotationally connected to the actuation element to supply the actuation drive force to the actuation element upon receipt, by the link, of the first drive force or the second drive force.

2. The assembly of claim 1, further comprising:
   an actuator housing that at least partially houses both the electromechanical actuator and the hydraulic actuator.

3. The assembly of claim 1, wherein the electromechanical actuator comprises:
   an electric motor adapted to be controllably energized and configured, upon being controllably energized, to supply a drive torque;
   an actuation mechanism coupled to receive the drive torque from the motor and configured, upon receipt thereof, to translate and supply the first drive force.

4. The assembly of claim 3, wherein the electromechanical actuator further comprises:
   a position sensor configured to sense actuation mechanism position and supply a position signal representative thereof.

5. The assembly of claim 3, wherein the electric motor comprises a brushless DC machine.

6. The assembly of claim 3, wherein the actuation element comprises a ballscrew-type actuator.

7. The assembly of claim 1, wherein the hydraulic actuator comprises:
   an actuation element adapted to selectively receive pressurized hydraulic fluid and configured, upon receipt thereof, to translate and supply the second drive force; and
   a directional control valve adapted to be controllably energized and configured, upon being controllably energized, to direct pressurized hydraulic fluid to the actuation element.

8. The assembly of claim 7, wherein the hydraulic actuator further comprises:
   a position sensor configured to sense actuation mechanism position and supply a position signal representative thereof.

9. The assembly of claim 7, wherein the actuation element comprises a piston-type actuator.

10. A flight control surface actuation system, comprising:
an actuation element adapted to couple to a flight control surface and to receive an actuation drive force, the actuation element responsive to the actuation drive force to move the flight control surface to a commanded position;
an electromechanical actuator adapted to be controllably energized and configured, upon being controllably energized, to supply a first drive force;
a hydraulic actuator connected to the electromechanical actuator and adapted to receive pressurized hydraulic fluid, the hydraulic actuator configured, upon receipt of pressurized hydraulic fluid, to supply a second drive force;
a link having a first end and a second end, the link rotationally connected to the electromechanical actuator at a position between the link first and second ends to receive the first drive force therefrom, the link first end rotationally connected to the hydraulic actuator to receive the second drive force therefrom, the link second end rotationally connected to the actuation element to supply the actuation drive force to the actuation element upon receipt, by the link, of the first drive force or the second drive force; and
an actuator controller adapted to receive actuator position commands and operable, in response thereto, to controllably energize the electromechanical actuator or controllably direct pressurized hydraulic fluid to the hydraulic actuator.

11. The system of claim 10, comprising:
an actuator housing that at least partially houses both the electromechanical actuator and the hydraulic actuator.

12. The system of claim 10, wherein the electromechanical actuator comprises:

an electric motor adapted to be controllably energized by the actuator controller and configured, upon being controllably energized, to supply a drive torque;
an actuation mechanism coupled to receive the drive torque from the motor and configured, upon receipt thereof, to translate and supply the first drive force; and
a position sensor configured to sense actuation mechanism position and supply a position signal representative thereof to the actuator controller.

13. The system of claim 12, wherein the actuation element comprises a ballscrew-type actuator.

14. The system of claim 10, comprising:
a bidirectional hydraulic pump adapted to be controllably energized and operable, in response thereto, to supply the pressurized hydraulic fluid to the hydraulic actuator.

15. The system of claim 14, wherein the hydraulic actuator comprises:
an actuation element adapted to selectively the receive pressurized hydraulic fluid and configured, upon receipt thereof, to translate and supply the second drive force;
a directional control valve in fluid communication with the bidirectional hydraulic pump, the directional control valve coupled to be controllably energized by the actuator controller and configured, upon being controllably energized, to direct pressurized hydraulic fluid to the actuation element; and
a position sensor configured to sense actuation mechanism position and supply a position signal representative thereof to the actuator controller.

16. The system of claim 15, wherein the actuation element comprises a piston-type actuator.

* * * * *